(12) United States Patent
Mixon et al.

(10) Patent No.: US 11,777,361 B2
(45) Date of Patent: Oct. 3, 2023

(54) WATER BLOCKING MOTOR COVER FOR A SUNROOF SYSTEM

(71) Applicant: AISIN TECHNICAL CENTER OF AMERICA, INC., Northville, MI (US)

(72) Inventors: Michael Mixon, Brighton, MI (US); Jacob Grimaldo, Westland, MI (US); Joel Runyan, Canton, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 143 days.

(21) Appl. No.: 17/456,807

(22) Filed: Nov. 29, 2021

(65) Prior Publication Data

US 2023/0170757 A1 Jun. 1, 2023

(51) Int. Cl.
*H02K 5/10* (2006.01)
*B60J 7/057* (2006.01)
*H02K 5/22* (2006.01)
*H02K 7/116* (2006.01)

(52) U.S. Cl.
CPC ............. *H02K 5/10* (2013.01); *B60J 7/0573* (2013.01); *H02K 5/225* (2013.01); *H02K 7/116* (2013.01)

(58) Field of Classification Search
CPC .......... H02K 5/10; H02K 5/225; H02K 7/116; B60J 7/0573
USPC ............................................................ 310/71
See application file for complete search history.

(56) References Cited

U.S. PATENT DOCUMENTS

| | | | |
|---|---|---|---|
| 2,985,483 A | 5/1961 | Bishop et al. | |
| 3,911,802 A | 10/1975 | Morden | |
| 4,243,261 A | 1/1981 | Trenkler | |
| 4,420,184 A | 12/1983 | Kalz | |
| 4,471,251 A * | 9/1984 | Yamashita | B60J 5/0405 |
| | | | 310/91 |
| 4,671,565 A | 6/1987 | Grimm et al. | |
| 4,811,985 A | 3/1989 | Kruger et al. | |
| 4,852,422 A | 8/1989 | Mori | |
| 5,018,783 A | 5/1991 | Chamings et al. | |
| 5,080,429 A | 1/1992 | Omoto et al. | |

(Continued)

FOREIGN PATENT DOCUMENTS

DE 2 309 317 10/1973
DE 43 13 687 A1 11/1994
(Continued)

OTHER PUBLICATIONS

"How do you Make an Electric Motor Waterproof?", PE Power Electric, 2021, https://www.powerelectric.com/motor-resources/motors101/waterproofmotors.

*Primary Examiner* — John K Kim
(74) *Attorney, Agent, or Firm* — Oblon, McClelland, Maier & Neustadt, L.L.P.

(57) ABSTRACT

A motor assembly for a sunroof system is provided with a motor cover to prevent water intrusion. The motor assembly includes a motor including a motor yoke, a connector electrically connected to the motor, a central portion including a pinion gear rotated by the motor, and a motor cover. The motor cover includes a motor yoke cover that covers the motor yoke, a central cover that covers the central portion, and a connector cover that covers the connector, the motor cover configured to prevent water in the central portion from entering the motor yoke and the connector.

8 Claims, 7 Drawing Sheets

(56) References Cited

U.S. PATENT DOCUMENTS

| | | | |
|---|---|---|---|
| 5,310,241 A * | 5/1994 | Omoto | B60J 7/0573 |
| | | | 296/219 |
| 6,520,570 B2 | 2/2003 | Schatzler | |
| 7,163,260 B2 | 1/2007 | Reitzloff et al. | |
| 8,671,621 B2 | 3/2014 | Yoshida et al. | |
| 2006/0260199 A1 | 11/2006 | Jorgensen et al. | |
| 2010/0320808 A1* | 12/2010 | Marx | B60J 7/0084 |
| | | | 296/217 |
| 2011/0198954 A1* | 8/2011 | Saito | H02K 13/10 |
| | | | 310/83 |
| 2013/0162087 A1* | 6/2013 | Ishikawa | H02K 23/20 |
| | | | 310/154.01 |
| 2013/0220073 A1* | 8/2013 | Suto | B29C 70/00 |
| | | | 74/606 R |
| 2018/0187791 A1* | 7/2018 | Yamanaka | H02K 11/215 |
| 2018/0266530 A1* | 9/2018 | Alfano | H01R 13/5202 |
| 2023/0170757 A1* | 6/2023 | Mixon | B60J 7/0573 |
| | | | 310/71 |

FOREIGN PATENT DOCUMENTS

| | | |
|---|---|---|
| DE | 10 2004 050 107 B4 | 8/2008 |
| JP | 2001-1248357 A | 9/2001 |
| WO | WO 2020035280 A1 | 2/2020 |

* cited by examiner

WATER BLOCKING MOTOR COVER FOR A SUNROOF SYSTEM

FIELD OF THE DISCLOSURE

This disclosure relates generally to vehicles and, more particularly, to a motor cover for a motor assembly for use with sunroof systems of vehicles.

BACKGROUND

Motor vehicles employ a sunroof system to allow exterior light into an interior of the vehicle. The sunroof system may include one or more glass panels that open and close. The sunroof system may also include a shade that covers at least a portion of the glass panels. These panels and the shade of the sunroof system may be moved by an output torque of one of more sunroof motors. These motors may be in the vehicle in an area with water intrusion. Accordingly, protecting the one or more motors from water penetration may be necessary to maintain suitable operation of the one or more motors.

BRIEF SUMMARY

A motor assembly for a sunroof system is provided with a motor cover to prevent water intrusion. The motor assembly includes a motor including a motor yoke, a connector electrically connected to the motor, a central portion including a pinion gear rotated by the motor, the motor yoke and the connector on opposite sides of the central portion, and a motor cover. The motor cover includes a motor yoke cover that covers the motor yoke, a central cover that covers the central portion, and a connector cover that covers the connector, the motor cover configured to prevent water in the central portion from entering the motor yoke and the connector.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings.

The figures are not to scale. In general, the same reference numbers will be used throughout the drawing(s) and accompanying written description to refer to the same or like parts.

DETAILED DESCRIPTION

The description set forth below in connection with the appended drawings is intended as a description of various aspects of the disclosed subject matter and is not necessarily intended to limit any aspect. In certain instances, the description includes specific details for providing an understanding of the disclosed subject matter. However, it will be apparent to those of ordinary skill in the art that aspects may be practiced without these specific details. In some instances, well-known structures and components may be shown in block diagram form to avoid obscuring the concepts of the disclosed subject matter.

Figure 1:
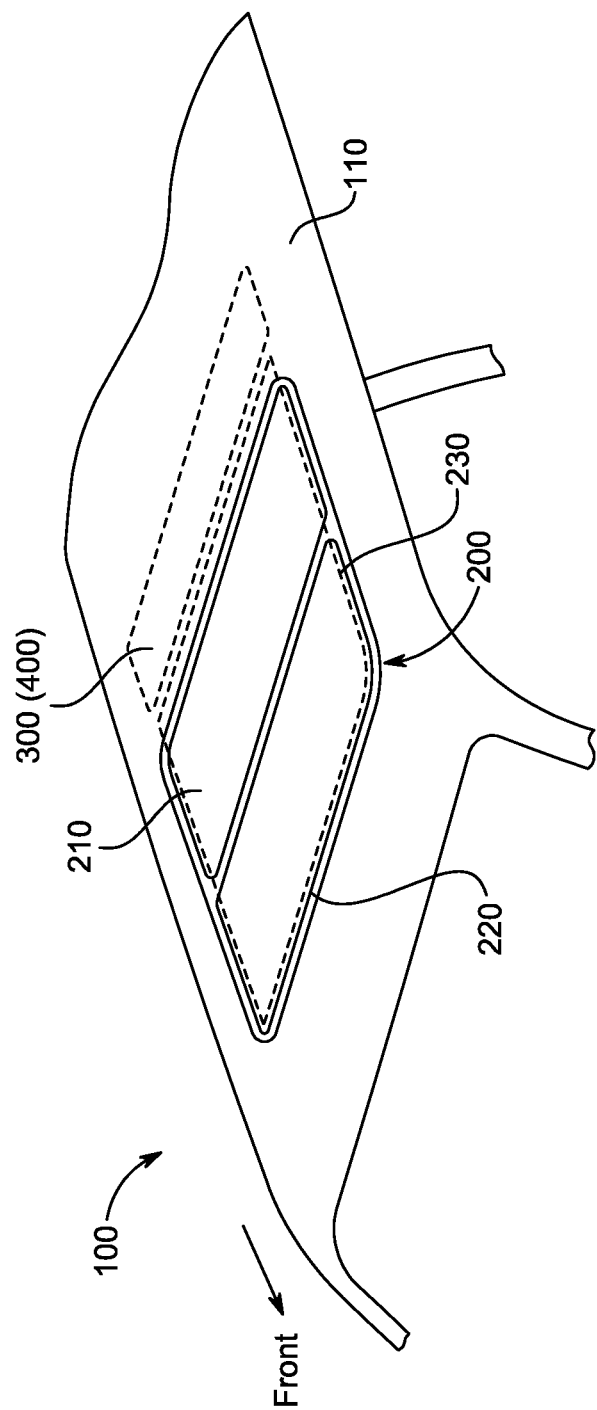
FIG. 1 is a perspective top view of an example vehicle including a sunroof system in accordance with the present disclosure.

FIG. 1 is a perspective top view of a vehicle (e.g., a car, a truck, a sport utility vehicle, a van, etc.) 100 in which a sunroof system described herein can be implemented. According to the illustrated example of FIG. 1, the vehicle 100 includes a panoramic sunroof system 200 mounted in a top frame 110 of the vehicle 100. The panoramic sunroof system 200 includes a fixed glass panel 210 provided on the rear side of the vehicle 100 and a movable glass panel 220 provided on the front side of the vehicle 100. When the movable glass panel 220 is opened, the movable glass panel 220 moves in the rear direction of the vehicle. When the movable glass panel 220 is closed, the movable glass panel 220 moves in the front direction of the vehicle. Further, the panoramic sunroof system 200 includes a shade system 230 under the glass panels 210, 220. The shade system 230 is movable in the front-rear direction of the vehicle 100 to selectively cover at least a portion of an interior side of the glass panels 210, 220.

Two cable drive units 300, 400 for driving the panoramic sunroof system 200 are adjacent to the fixed glass panel 210 and to the shade system 230 on the rear side of panoramic sunroof system 200. The two cable drive units 300, 400 can be housed in the top frame 110. Utilizing the cable drive units 300, 400, the movable glass panel 220 and the shade system 230 may be moved to a desired position. For example, to prevent exterior light from entering the interior of the vehicle, the cable drive unit 400 may be operated to move the shade 231 (see FIG. 3) of the shade system 230 to cover the glass panels 210, 220. Additionally, the cable drive unit 300 may be operated to open and close the movable glass panel 220.

Figure 2:
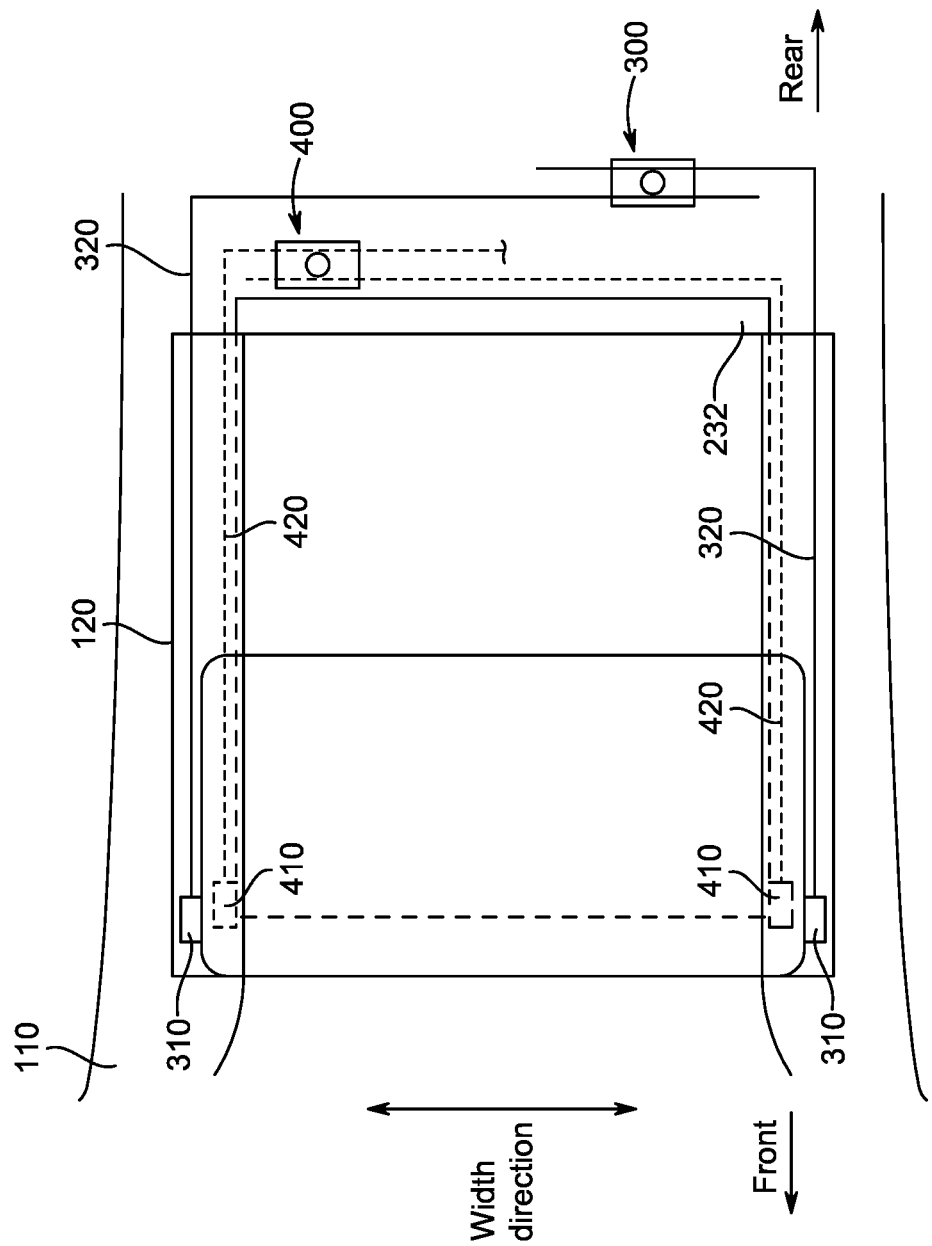
FIG. 2 is a top view schematic diagram of the sunroof system in accordance with the present disclosure.

FIG. 2 is a top view schematic diagram of the vehicle sunroof system 200 of FIG. 1. As illustrated in FIG. 2, the movable glass panel 220 is driven by the first cable drive unit 300. The first cable drive unit 300 includes two glass panel shoes 310 and two first cables 320. The two glass panel shoes 310 are attached to the outside edges of the movable glass panel 220 in a vehicle width direction of the vehicle 100. The two first cables 320 connect between the two glass panel shoes 310 and the cable drive unit 300. Accordingly, the movable glass panel 220 can move in the front-rear direction of the vehicle 100 via the cable drive unit 300, the first cables 320, and the glass panel shoes 310.

The shade 231 of the shade system 230 is driven by the second cable drive unit 400. The second cable drive unit 400 includes two shade shoes 410 and two second cables 420. The two shade shoes 410 are attached to the outside edges of the shade 231 in the vehicle width direction of the vehicle 100. The two second cables 420 connect between the two shade shoes 310 and a motor assembly 430 (See FIG. 3) of the second cable drive unit 400. The motor assembly 430 includes a pinion gear 440 that meshes with the two second cables 420 and can drive the two second cables 420 in different directions. The shade 231 is attached a rotating body 232 that is biased to rotate in a winding direction to wind the shade 231 around the rotating body 232. Accordingly, the shade 231 can move in the front-rear direction of the vehicle 100 via the cable drive unit 400, the second cables 420, and the shade shoes 410.

As shown in FIG. 2, the panoramic sunroof system 200 includes two rail guides 120 arranged on opposites sides of the movable glass panel 220 and the shade 231 in the width direction of the vehicle 100. The glass panel shoes 310 and the shade shoes 410 are movable along the rail guides 120 in the front-rear direction of the vehicle 100 due to respective operation of the cable drive units 300 and 400.

Figure 3:
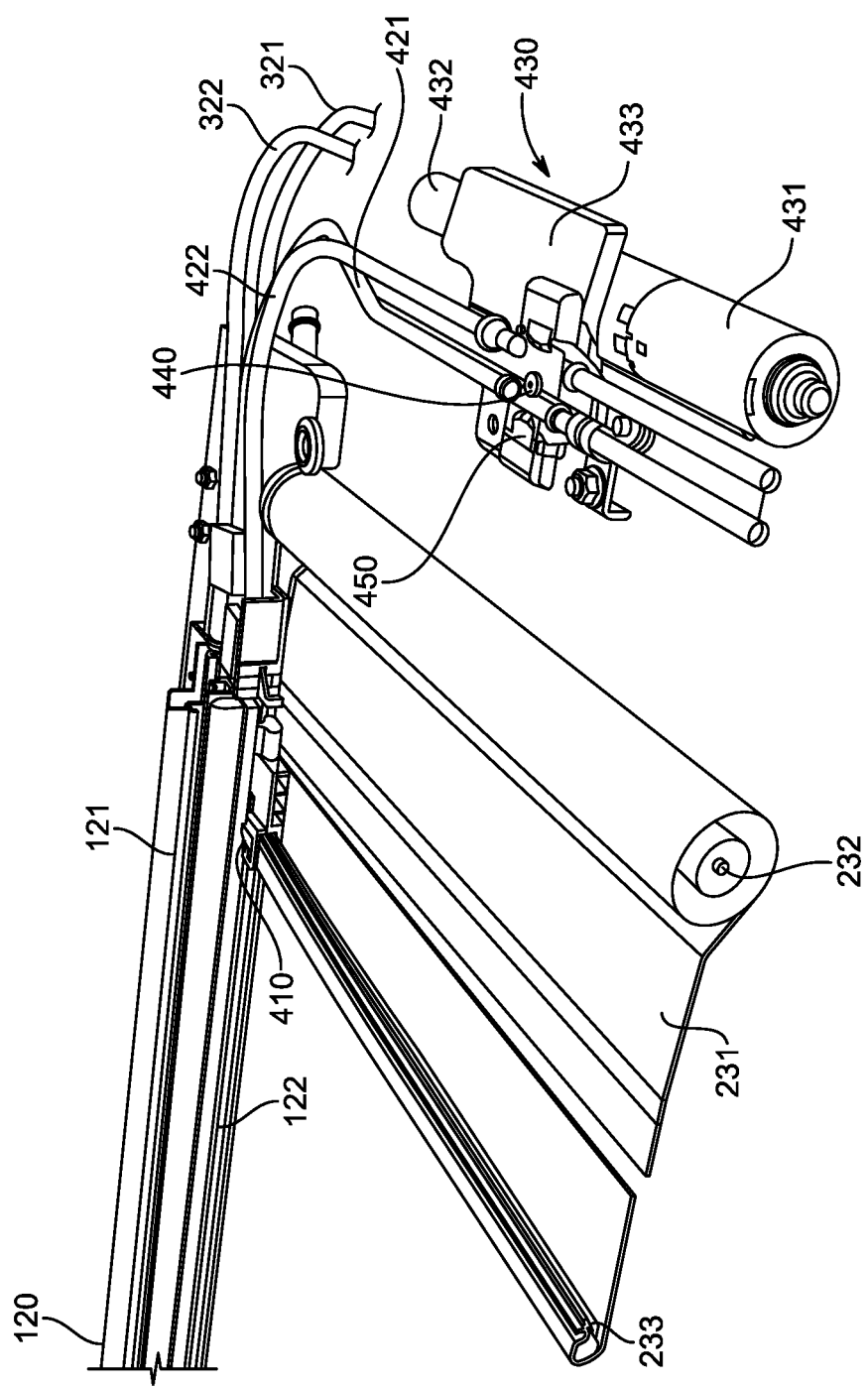
FIG. 3 is a perspective top view of a sunroof motor assembly and drive cables of the sunroof system in accordance with the present disclosure.

FIG. 3 is a perspective top view of an example sunroof system in accordance with the teachings of this disclosure. FIG. 3 shows a relationship between the shade system 230 and the second cable drive unit 400. The motor assembly 430 includes a motor yoke 431, a motor connector 432, and a central portion 433. Two cable tubes 321, 322 that movably accommodate the two first cables 320 are provided and may be mounted to the motor assembly 430. Two cable tubes 421, 422 that movably accommodate the two second cables 420 are provided and may be mounted to the motor assembly 430. In addition, the motor assembly 430 includes the pinion gear 440 that meshes with the two second cables 420 and a motor bracket 450 to surround the pinion gear 440. For facilitating operation of the panoramic sunroof system 200, the first cables 320 and the second cables 420 include external teeth that mesh with the pinion gear 440.

As shown in FIG. 3, the rail guides 120 includes a first rail 121 on which the glass panel shoes 310 are able to move and a second rail 122 on which shade shoes 410 are able to move. The shade 231 includes a leading edge 233 at a front end in the vehicle front direction. The leading edge 233 has a rigid construction relative to the shade 231. Outer edges of the leading edge 233 in the vehicle width direction are attached to inner portions of the shade shoes 410. Accordingly, when the shade shoes 410 move along the second rail 122 towards a front of the vehicle, the leading edge 233 moves in the front direction and the rotating body 232 wound with the shade 231 rotates. Therefore, the shade 231 is extended to cover the fixed glass panel 210 and the movable glass panel 220 from below.

Figure 4:
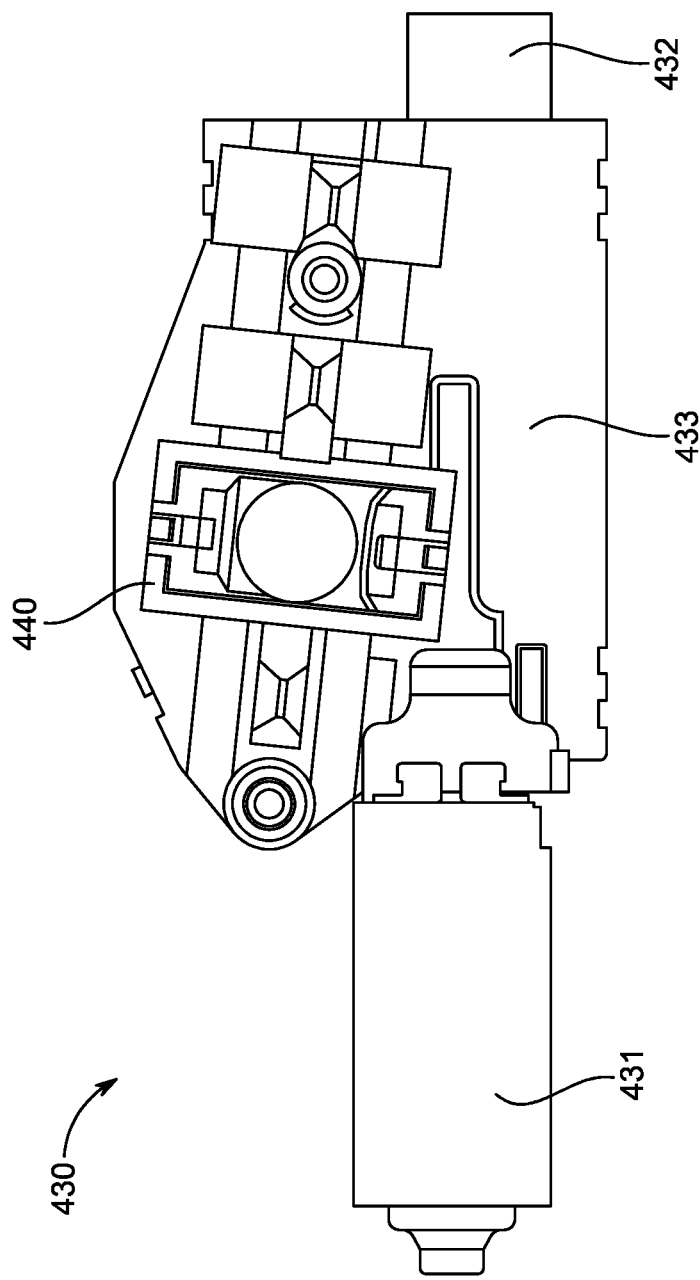
FIG. 4 is an isolated top view of the sunroof motor assembly in accordance with the present disclosure.

FIG. 4 is an isolated top view of the sunroof motor assembly 430 in accordance with the present disclosure. FIG. 4 illustrates the motor yoke 431 on the left side of the motor assembly 430. The motor yoke 431 is a magnetic frame of a stator of a motor of the sunroof motor assembly 430. The motor providing a torque to rotate the pinion gear 440 to operate the second cables 420. The sunroof motor assembly 430 includes the central portion 433 to the right of the motor yoke 431. The central portion 433 includes the pinion gear 440. The central portion 433 may also include circuitry such as a printed circuit board for the control of the motor of the motor assembly 430. To the right of the central portion 433 is the connector 432 of the motor assembly 430. The connector 432 includes a plurality of pins and/or sockets to connect to a wiring harness of the vehicle 100. The connector 432 being electrically connected to the circuitry in the central portion 433 and to the motor yoke 431.

Figure 5:
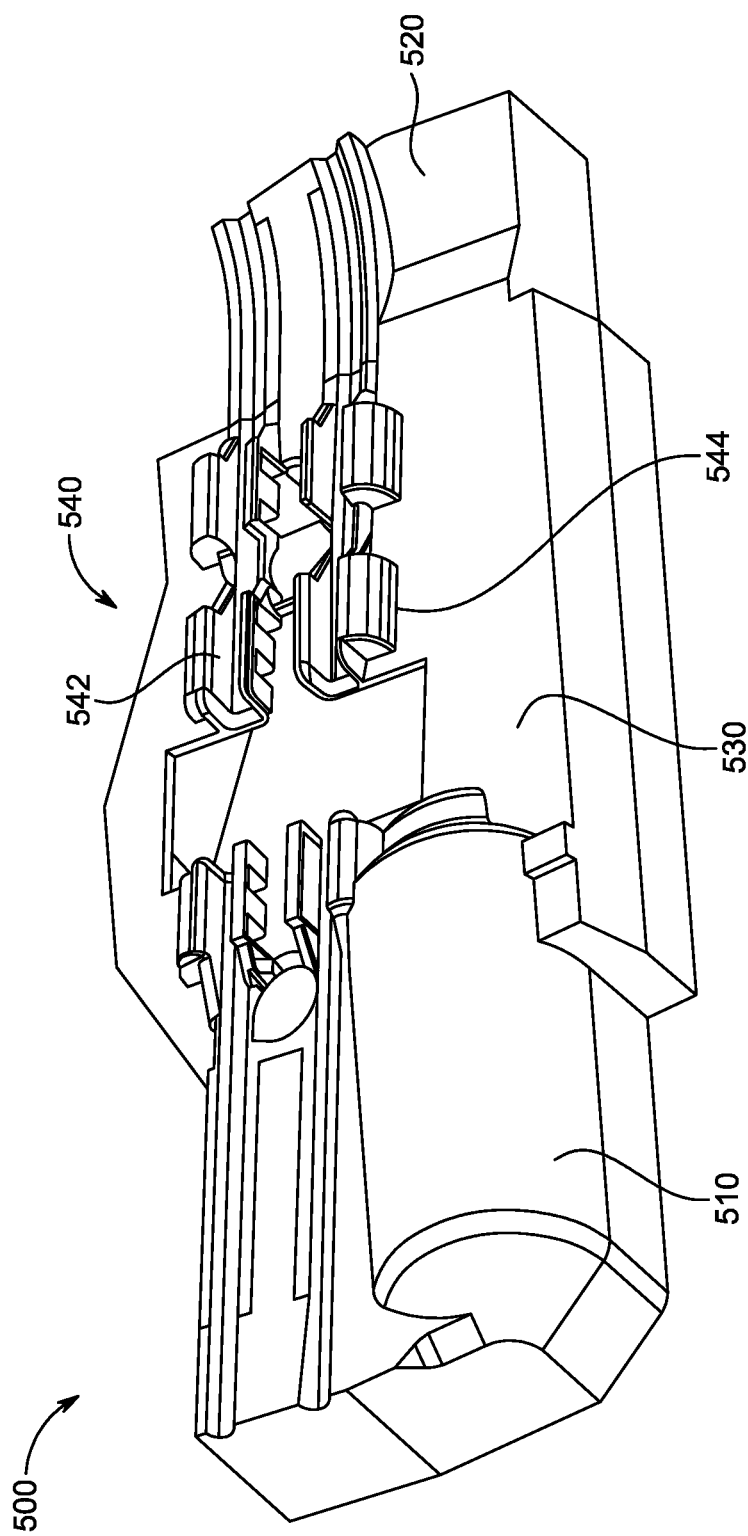
FIG. 5 is a perspective top view of a motor cover of the sunroof motor assembly in accordance with the present disclosure.

FIG. 5 is a perspective top view of a cover 500 of the sunroof motor assembly in accordance with the present disclosure. The cover 500 includes a motor yoke cover 510, a central cover 530, and a connector cover 520. The motor yoke cover 510 covers at least a top and a side portion of the motor yoke 431. The central cover 530 covers at least a top of the central portion 433. A top of the central cover 530 includes a cable retainer 540 to hold the second cables 420 in a predetermined position. The cable retainer 540 includes cable mounts 542 and 544 which respectively hold the cable tubes 421 and 422. The cable mounts 542 and 544 may be integrally formed with the central cover 520 and include a plurality of protrusions to hold the cable tubes 421 and 422. The connector cover 520 covers at least a top and side portion of the connector 432. The connector cover 520 may also cover a portion of the vehicle wire harness that connects to the connector 432.

Figure 6:
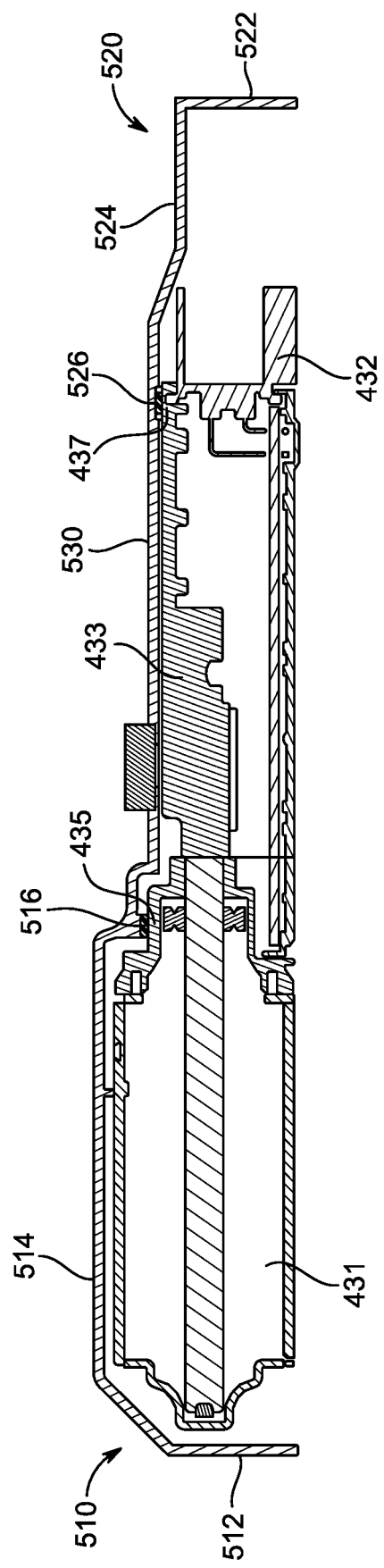
FIG. 6 is a cross-section view of the motor cover and the sunroof motor assembly in accordance with the present disclosure.

FIG. 6 is a cross-section view of the motor cover 500 and the sunroof motor assembly 430 in accordance with the present disclosure. Here, the motor yoke cover 510 includes a side motor yoke cover 512 that covers an axial end of the motor yoke 431 that is opposite to the central portion 433. The motor yoke cover 510 also includes a top motor yoke cover 514 that covers a top of the motor yoke 431. The connector cover 520 includes a side connector cover 522 that covers an open side of the connector 432 that receives the wiring harness of the vehicle and that is opposite to the central portion 433. The connector cover 520 also includes a top connector cover 524 that covers the top of the connector 432.

The central cover 530 includes a first seal 516 and a second seal 526. As discussed above, the central portion 433 includes the pinion gear 440 and thus has an area in which the second cables 420 may enter. The central portion 433 includes a labyrinth structure or tortuous path to lead any water that enters via an area proximate to the pinion gear 440 away from the internal circuitry. The first seal 516 is provided on a bottom side of the central cover 530 to make a water-tight seal between the central portion 433 and the motor yoke 431. The second seal 526 is provided on the bottom side of the central cover 530 to make a water-tight seal between the central portion 433 and the connector 432. The first seal 516 and the second seal 526 can made of any suitable material such as rubber, foam, caulk, or the like. The first seal 516 and the second seal 526 can be applied by adhesive or held by pressure.

The central portion 433 includes a first sealing surface 435 and a second sealing surface 437. The first sealing surface 435 is adjacent the motor yoke 431 on a top side of the central portion 433. The first seal 516 is arranged between the bottom side of the central cover 530 and the first sealing surface 435 of the central portion 433. The top motor yoke cover 514 extends from the first seal 516 to the side motor yoke cover 512. The second sealing surface 437 is adjacent to the connector 432 on the top side of the central portion 433. The second seal 526 is arranged between the bottom side of the central cover 530 and the second sealing surface 437 of the central portion 433. The top connector cover 524 extends from the second seal 526 to the side connector cover 522. Due to the placement of the first seal 516 and the second seal 526 water is prevented from entering the motor yoke 431 and the connector 432 from the central portion 433.

Further, the side motor yoke cover 512 and the top motor yoke cover 514 prevent water from entering the motor yoke 431 from above and to the side of the motor yoke 431 that is opposite of the central portion 433. The side connector cover 522 and the top connector cover 524 prevent water from entering the connector 432 from above and to the side of the connector 432 that is opposite to the central portion 433. Accordingly, the combination of the exterior portions of the motor cover 500 and the interior seals 516 and 526 prevent water from respectively entering the motor yoke 431 and connector 432. That is, the motor yoke 431 and the connector 432 are fully blocked from water drip, spray, or splash. This arrangement prevents electrical components in the motor yoke 431 and the connector 432 from any potential contact with water, thereby increasing the level of safety of the motor assembly 430.

It is understood that a motor cover 500 can include any combination of the motor yoke cover 520, first seal 516, connector cover 520, and second seal 526. In some applications it may be advantageous to prevent water from entering one or both of the motor yoke 431 and the connector 432.

Figure 7:
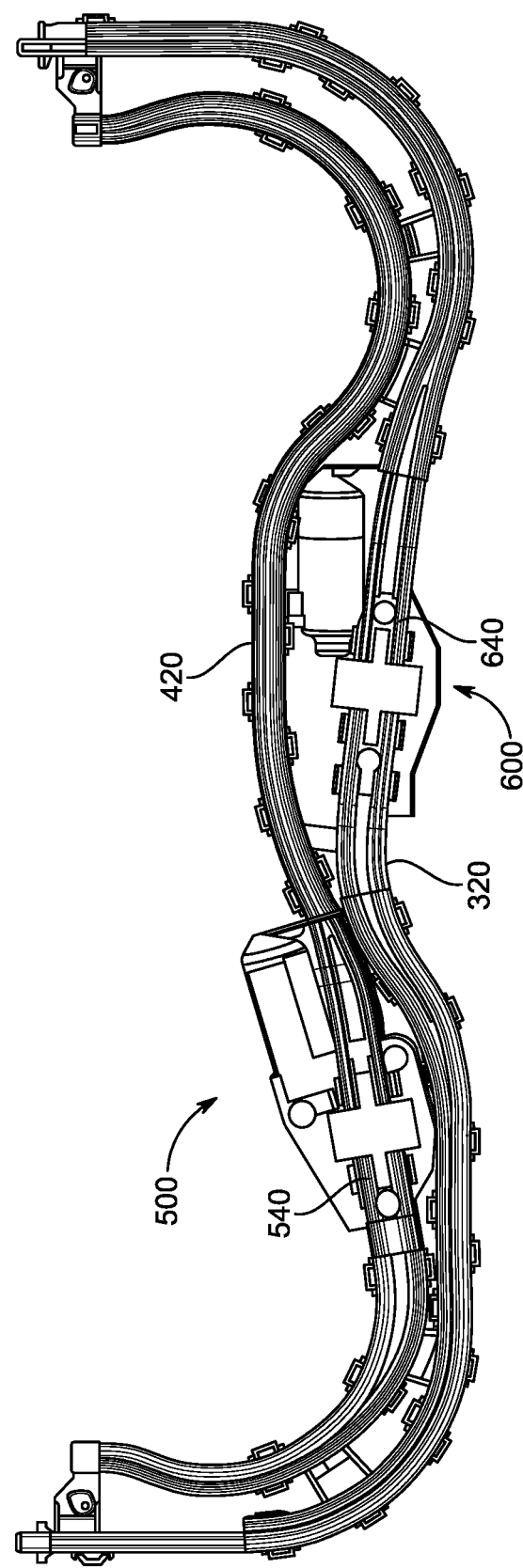
FIG. 7 is a top view of two sunroof motor assemblies and drive cables in accordance with the present disclosure.

FIG. 7 is a top view of two sunroof motor assemblies and drive cables in accordance with the present disclosure. FIG. 7 illustrates two motor assemblies respectively covered by the motor cover 500 and a motor cover 600. The motor cover 500 includes the cable retainer 540 to hold the second cables 420 in a predetermined position. The motor cover 600 includes a cable retainer 640 to hold the first cables 320 in a predetermined position. By including the cable retainers 540 and 640, the motor cover 500 and the motor cover 600 form cable tracks that allow the drive cables 320 and 420 to be fully constrained while interacting with the respective motor gearing.

Although certain example apparatus has been disclosed herein, the scope of coverage of this patent is not limited thereto. Obviously, numerous modifications and variations are possible considering the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A motor assembly for a sunroof system of a vehicle, comprising:
   a motor including a motor yoke;
   a connector electrically connected to the motor yoke;
   a central portion including a pinion gear rotated by the motor, the motor yoke and the connector being on opposite sides of the central portion; and
   a motor cover including a motor yoke cover that covers the motor yoke, a central cover that covers the central portion, and a connector cover that covers the connector, the motor cover configured to prevent water in the central portion from entering the motor yoke and the connector.

2. The motor assembly of claim 1, further comprising:
   a first seal between a bottom side of the central cover and a first sealing surface of the central portion that is adjacent to the motor yoke; and
   a second seal between the bottom side of the central cover and a second sealing surface of the central portion that is adjacent to the connector.

3. The motor assembly of claim 1, further comprising:
   two cables meshing with the pinion gear and movable by rotation of the motor, the two cables operable to move a structure of the sunroof system.

4. The motor assembly of claim 3, wherein:
   a top side of the central cover includes a cable retainer that holds the two cables.

5. The motor assembly of claim 1, wherein:
   the motor yoke cover includes a top motor yoke cover that covers a top of the motor yoke and a side motor yoke cover that covers an axial end of the motor yoke opposite to the central portion.

6. The motor assembly of claim 2, wherein:
   the motor yoke cover includes a top motor yoke cover that covers a top of the motor yoke and a side motor yoke cover that covers an axial end of the motor yoke opposite to the central portion, and
   the top motor yoke cover extends between the first seal and the side motor yoke cover.

7. The motor assembly of claim 1, wherein:
   the connector cover includes a top connector cover that covers a top of the connector and a side connector cover that covers an end of the connector opposite to the central portion.

8. The motor assembly of claim 2, wherein:
   the connector cover includes a top connector cover that covers a top of the connector and a side connector cover that covers an end of the connector opposite to the central portion, and
   the top connector cover extends between the second seal and the side connector cover.

* * * * *